US012743899B2

(12) United States Patent
Choi et al.

(10) Patent No.: US 12,743,899 B2
(45) Date of Patent: Sep. 22, 2026

(54) METHOD FOR ANALYZING NEURONAL PATTERNS IN GOLGI-STAINED IMAGES

(71) Applicant: Leica Microsystems CMS GmbH, Wetzlar (DE)

(72) Inventors: Won Yung Choi, Wetzlar (DE); Hung-Yu Chang, Wetzlar (DE); Chi-Chou Huang, Wetzlar (DE); Hoyin Lai, Wetzlar (DE); Sean McElroy, Wetzlar (DE); Luciano Andre Guerreiro Lucas, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 268 days.

(21) Appl. No.: 18/508,896

(22) Filed: Nov. 14, 2023

(65) Prior Publication Data

US 2025/0157232 A1 May 15, 2025

(30) Foreign Application Priority Data

Jun. 12, 2023 (DE) ..................... 10 2023 115 281.5

(51) Int. Cl.
*G06V 20/69* (2022.01)
*G06V 10/82* (2022.01)

(52) U.S. Cl.
CPC ............ *G06V 20/698* (2022.01); *G06V 10/82* (2022.01)

(58) Field of Classification Search
None
See application file for complete search history.

(56) References Cited

PUBLICATIONS

Yan et al., "Automated and accurate detection of soma location and surface morphology in large-scale 3D neuron images" (Year: 2013).*
Rodriguez et al., "Three-dimensional neuron tracing by voxel scooping" (Year: 2009).*
Liu et al., "Neuron tracing from light microscopy images: automation, deep learning and bench testing" (Year: 2022).*
Wu et al., "3D BrainCV: simultaneous visualization and analysis of cells and capillaries in a whole mouse brain with one-micron voxel resolution" (Year: 2013).*
A. Rodriguez et al., "Three-Dimensional Neuron Tracing by Voxel Scooping." J. Neurosci. Methods, vol. 184, No. 1, pp. 169-175, 2009, 14 pages.

(Continued)

*Primary Examiner* — S J Park
(74) *Attorney, Agent, or Firm* — LEYDIG, VOIT & MAYER, LTD.

(57) ABSTRACT

A first aspect of this disclosure is related to a computer-implemented method for identifying neuronal patterns in an image, comprising the steps:
- obtaining a first data set with Golgi-stained neuronal structures;
- based on the first data set, determining a first auxiliary data set, AR1, based on a first type of neuronal structure and a second auxiliary data set, AR2, based on a second type of neuronal structure;
- analyzing AR1 with a first method to identify information related to the first type of neuronal structure in AR1;
- analyzing AR2 with a second method to identify information related to the second type of neuronal structure in AR2;
- generating a second data set with the identified information related to the first and second type of neuronal structures.

19 Claims, 3 Drawing Sheets

(56) References Cited

PUBLICATIONS

Chen et al., "Deep-Learning-Based Automated Neuron Reconstruction From 3D Microscopy Images Using Synthetic Training Images," IEEE Transactions on Medical Imaging, IEEE, USA, vol. 41, No. 5, Nov. 30, 2021, pp. 1031-1042, 12 pages.
Anonymous: "Golgi's method—Wikipedia," May 28, 2022, Retrieved from the Internet URL: https://en.wikipedia.org/wiki/Golgi%27s_method, 3 pages.
Li et al., "3D Neuron Reconstruction in Tangled Neuronal Image With Deep Networks," IEEE Transactions on Medical Imaging, IEEE, USA, vol. 39, No. 2, Jul. 8, 2019, pp. 425-435, 11 pages.
Anonymous: "Otsu's method—Wikipedia", Apr. 27, 2023, Retrieved from the Internet URL: https://en.wikipedia.org/wiki/Otsu%27s_method, 11 pages.

* cited by examiner

METHOD FOR ANALYZING NEURONAL PATTERNS IN GOLGI-STAINED IMAGES

TECHNICAL FIELD

The disclosure is related to computer-implemented methods for identifying neuronal patterns in an image and it is related to a device, e.g. a microscope, for identifying neuronal patterns in an image.

BACKGROUND

Golgi staining is a classical staining technique widely used in the field of neuroscience for morphological studies of neurons. First published in 1873, this technique has the unique ability to stain a small number of neurons (~1-3% of total neurons) in their entirety, enabling visualization of the complete neuronal structure.

However, internal experience show that, when the method is used with brightfield imaging microscopy, in particular two specific challenges for downstream image analysis become apparent. Firstly, objects that are out of focus appear as blurry objects on multiple planes. Secondly, the dark and opaque nature of Golgi stain causes physical shadows from neuronal somas and dendrites, reducing the signal-to-noise ratio of respective measurements. Similar problems might arise in related methods, such as Nissl staining or staining with other fluorescent dyes. Therefore, improvements in these fields are desirable.

SUMMARY

An object of the present disclosure is improvement of analyzing Golgi-stained images.

This object is solved by the disclosed embodiments, which are defined in particular by the subject matter of the independent claims. The dependent claims provide information for further embodiments. Various aspects and embodiments of these aspects are also disclosed in the summary and description below, which provide additional features and advantages.

A first aspect of this disclosure is related to a computer-implemented method for identifying neuronal patterns in an image, comprising the steps:

- obtaining a first data set with Golgi-stained neuronal structures;
- based on the first data set, determining a first auxiliary data set, AR1, based on a first type of neuronal structure and a second auxiliary data set, AR2, based on a second type of neuronal structure;
- analyzing AR1 with a first method to identify information related to the first type of neuronal structure in AR1;
- analyzing AR2 with a second method to identify information related to the second type of neuronal structure in AR2;
- generating a second data set with the identified information related to the first and second type of neuronal structures.

A first or a second data set can be an image or any other form of a 2D-dataset. Alternatively, a first or a second data set can be a 3D-dataset and/or part of a multi-dimensional data set.

Golgi staining, also known as the Golgi impregnation method or Golgi-Cajal staining, is a neurohistological technique used to visualize and study the intricate structure of neurons, particularly their dendrites and axons. The Golgi staining process can involve impregnating a small number of neurons with a silver chromate or silver nitrate solution. The staining method can be selective for neuronal structures, such as somas, dendrites, spines, etc. rendering them visible under a microscope. The stained neurons can appear as dark, intricate networks of dendrites and axons against a light background and can provide researchers with a three-dimensional view of a neuronal morphology. Despite its importance, Golgi staining has limitations, such as the unpredictability of which neurons will be stained and the difficulty in staining entire neuronal networks. Furthermore, Golgi-stained data sets might comprise noise, such that it is difficult to differentiate between different neuronal structures and/or that it is difficult to understand which neuronal structures belong together. Noisy images may contain blurred structures and/or shadows cast by certain structures onto other structures. Golgi-staining in the context of this disclosure can also comprise other staining techniques that exhibit similar drawbacks, e.g. Nissl-staining.

The method according to the first aspect should improve visibility of different neuronal structures, such as somas, dendrites and/or spines, etc. A soma, also known as the cell body or perikaryon, is the central part of the neuron. A soma can contain the cell's nucleus, which houses the genetic material and controls the cell's metabolic functions. A soma integrates incoming signals from dendrites and initiates the generation of electrical impulses. A dendrite is a branched, tree-like extension from a soma. A function of a dendrite can be to receive and transmit incoming signals from other neurons or sensory receptors. Dendrites can have receptors on their surfaces that bind to neurotransmitters released by presynaptic neurons at synapses. The received signals are then integrated in the dendrites, and if the combined signal is strong enough, it may trigger an action potential in the axon. A spine can be a small, protruding structure that is found on a dendrite. Spines can be specialized structures that serve as sites for synaptic connections with axon terminals of other neurons. Dendritic spines can come in various shapes and sizes and can change in response to synaptic activity and learning.

The first auxiliary data set can be based a pixel classification, for example, a pixel classification that is configured for somas. The first auxiliary data set can then comprise data related to one or more somas, such as a confidence map for somas. The second auxiliary data set can be a based on a pixel classification, for example, a pixel classification for dendrites and/or for spines. The second auxiliary data set can then comprise data related to dendrites and/or spines, such as a confidence map for dendrites and/or for spines. The first auxiliary data set and/or the second auxiliary data set can also be based on classifications for other types of neuronal structures and can then consequently comprise data related to these other types of neuronal structures.

A pixel classification can also be an image segmentation. It can be based on a deterministic and/or non-deterministic pixel classification method. A pixel classification method can comprise machine learning algorithms, random forest, support vector machines and/or (convolutional) neuronal networks. Additionally or alternatively, a pixel classification method can comprise semantic segmentation, clustering algorithms (e.g. K-Means Clustering or Mean-Shift Clustering). Furthermore, a pixel classification method can comprise thresholding, edge detection, and/or template matching. Transformation based methods, such as methods based on Fourier-transformation can also be part of a pixel classification method.

Based on a method according to the first aspect, a second data set, for example an image, can be provided that comprises identified neuronal structures based on the first data set, such as somas, dendrites and/or spines.

An embodiment of the first aspect of this disclosure is related to a computer-implemented method for identifying neuronal patterns in an image, wherein the first data set comprises a 2D or 3D information of neuronal structures.

The first data set can be an image. The first data set can be stored in a 2-dimensional, 3-dimensional, or multi-dimensional matrix or other suitable structure. The first data set can be a data set obtained by a microscope or any other apparatus that works with visible and/or invisible light. Depending on the algorithm used for generating the first and/or the second auxiliary data set, the first data set can be labelled to identify certain structures comprised within the data set.

An embodiment of the first aspect of this disclosure is related to a computer-implemented method for identifying neuronal patterns in an image, wherein at least one AR1 and AR2 comprises one or more confidence maps.

A confidence map can be a representation of the certainty or confidence associated with the information in an image (or a similar data set). It can provide a pixel-wise or region-wise assessment of how reliable or trustworthy the data at each location in the image is, in particular with respect to a specific content, e.g. a soma, a dendrite, and/or a spine. A confidence map can assign a confidence score to each pixel or region in an image. High-confidence regions typically indicate that the algorithm is very certain about the information there, while low-confidence regions suggest uncertainty. A confidence map can be generated using various techniques, including probabilistic models, machine learning, statistical analysis, or heuristics. In semantic segmentation and/or object detection, a confidence map can accompany the segmentation/identification result (related to a desired neuronal structure), indicating how confident the method is about the object boundaries and further parameters assigned to each pixel/region of the first data set. A confidence map can be visualized as grayscale images or color-coded overlays on the original first image.

An embodiment of the first aspect of this disclosure is related to a computer-implemented method for identifying neuronal patterns in an image, wherein the first type of neuronal structure is a soma.

An embodiment of the first aspect of this disclosure is related to a computer-implemented method for identifying neuronal patterns in an image, wherein the second type of neuronal structure is a dendrite.

Additionally, the second type of neuronal structure can also comprise a spine. In this case dendrites and spines can be defined based on the same second auxiliary data set. This auxiliary data set may have been established based on a pixel classification method configured for dendrites and spines.

An embodiment of the first aspect of this disclosure is related to a computer-implemented method for identifying neuronal patterns in an image, wherein AR1 and/or AR2 are generated by a classifying machine learning algorithm, in particular a pixel classifier.

The auxiliary data sets can in particular be based on convolutional neuronal networks.

Different machine learning algorithms can be used, e.g. convolutional neuronal networks (CNNs), to execute image classification, object detection, and/or segmentation tasks. In microscopy, CNNs can be employed to identify and classify cells, organelles, and/or other structures of interest within the images, such as neuronal structures. Additionally or alternatively, semantic segmentation can be used to classify each pixel in an image into specific classes and/or regions of interest. Convolutional neuronal networks with architectures like U-Net or DeepLab can be used for semantic segmentation tasks in microscopy. Additionally or alternatively, instance segmentation can be used to identify and/or differentiate individual instances of objects, such as a single soma, within an image. Region-based convolutional neuronal networks and/or similar architectures can be used for instance segmentation tasks in microscopy. Additionally or alternatively, object detection algorithms can locate and classify multiple objects of interest within an image.

An embodiment of the first aspect of this disclosure is related to a computer-implemented method for identifying neuronal patterns in an image, wherein the machine learning algorithm comprises:

- a convolutional neuronal network with a first kernel, in particular directed to identify somata, to generate AR1.

A neuronal network can comprise a standard neuronal network, e.g. VGG and/or ResNET. VGG is a convolutional neuronal network architecture that is characterized by its use of small 3×3 convolutional filters and deep stacking of convolutional layers. ResNET is a deep convolutional neuronal network architecture that uses residual connections to enable training of very deep neuronal networks, up to hundreds of layers deep. In particular, a convolutional neuronal network can be used for efficient image processing. To determine continuous variables for scaling, translation, and rotation a fully connected single or a multilayer regression neuronal network can be used. The regression neuronal network can be a feedforward neuronal network, such as a multilayer perceptron. The regression neuronal network in particular can be configured to obtain its input from a convolutional neuronal network. With this architecture effective identification of neuronal structures such as somata, dendrites and/or spines are possible.

A first kernel can be constructed to identify somata. The kernel can in particular be shaped like a typical soma (i.e. round, oval) or shaped to detect an edge of a typical soma. In particular, a CNN can be trained to determine somata based on the first kernel from a confidence map. Thereby, somata comprised in the first data set can be effectively determined.

An embodiment of the first aspect of this disclosure is related to a computer-implemented method for identifying neuronal patterns in an image, wherein the machine learning algorithm comprises:

- a convolutional neuronal network with a second kernel, in particular directed to identify dendrites, to generate AR2.

A second kernel can be smaller than a first kernel. This can in particular be the case, if a first kernel, i.e. a kernel for a CNN to be applied to the first auxiliary data set, is configured for somata and the second kernel is configured for dendrites.

An embodiment of the first aspect of this disclosure is related to a computer-implemented method for identifying neuronal patterns in an image, wherein the machine learning algorithm comprises:

- a convolutional neuronal network with a kernel comprising a line feature to generate AR2.

Based on a kernel with a line feature, dendrites and/or spines can be effectively identified.

An embodiment of the first aspect of this disclosure is related to a computer-implemented method for identifying neuronal patterns in an image, wherein AR1 is analyzed by Otsu's method.

Otsu's method, also known as Otsu's thresholding or Otsu's binarization, is a processing technique for automatic image thresholding. Otsu's method can be used to automatically determine an optimal threshold value that separates an image into two classes, typically foreground and background, based on the pixel intensities. Otsu's method can be applied on a confidence map, in particular a confidence map resulting from a pixel classifier, e.g. for detection of somata.

An implementation of Otsu's method can comprise the following steps. First, a histogram of pixel intensities in an image (e.g. first data set or auxiliary data set) can be calculated. The histogram represents the frequency distribution of pixel values across the entire image. Otsu's method can then iteratively search for a threshold value can minimize the intra-class variance or maximizes the inter-class variance between the two classes identified in the image (e.g. foreground and background). For each possible threshold value between the minimum and maximum pixel intensities, two variances can be compared. The first variance is an intra-class variance (within-class variance). This is a measure of the spread of pixel values within each class (e.g. foreground and background). A lower intra-class variance indicates that the classes are more homogeneous. The second variance is an inter-class variance (between-class variance). This is a measure of the separation between the classes (e.g. foreground and background). A higher inter-class variance suggests a better discrimination between the classes. Otsu's method can then select the threshold value that maximizes the ratio of the inter-class variance to the intra-class variance. Thereby, a point or a region is found at which the two classes are best separated. Once an optimal threshold is determined, the image is binarized by classifying pixels with intensities below the threshold as one class (e.g. foreground) and pixels above the threshold as the other class (e.g. background).

An embodiment of the first aspect of this disclosure is related to a computer-implemented method for identifying neuronal patterns in an image, wherein AR2 is analyzed by voxel scooping.

Voxel scooping is a prior art data processing method wherein cross-sectional layers of voxels ('scoops') are iteratively carved out of a structure, and clustered based on connectivity. This can be used to trace the centerline of a neuron, in particular from confocal images. Further description can be found, e.g., in Rodriguez, A.; et al. (2009). "Three-dimensional neuron tracing by voxel scooping" in J. Neurosci. Methods. 184 (1): 169-175.

An embodiment of the first aspect of this disclosure is related to a computer-implemented method for identifying neuronal patterns in an image, comprising the step:

- identifying one or more third neuronal structures, in particular spine structures, attached to dendrites.

The third neuronal structures can in particular be based on the second auxiliary data set. For example, if the second auxiliary data set was generated for dendrites resulting in, e.g., a confidence map for dendrites, the second auxiliary data set can further be analyzed for spines, e.g. by a convolutional neuronal network trained for identifying spines. The identification of spines based on the second auxiliary data set can in particular be performed concurrently to the identification of dendrites.

Spines can be detected with blob detection. Blob detection is a computer vision technique that can be used to identify and/or locate regions or "blobs" of interest within an image. These blobs typically represent objects or areas with similar properties, such as color, intensity, or texture. The process involves analyzing an image to find connected regions of pixels that share common characteristics, which can be useful in various applications like object tracking, image segmentation, and feature extraction. Blob detection algorithms, can be based on the Laplacian of Gaussian, for example.

An embodiment of the first aspect of this disclosure is related to a computer-implemented method for identifying neuronal patterns in an image, comprising the step:

- assigning an identified first neuronal structure, in particular a soma, to an identified second neuronal structure, in particular a dendrite, and/or to a third neuronal structure, in particular a spine.

The assigning of different neuronal structures to each other can also be done by a machine learning algorithm such as a CNN. This facilitates the understanding which neuronal structures belong together, i.e. which complex of soma, dendrites and spines forms a single neuron.

An embodiment of the first aspect of this disclosure is related to a computer-implemented method for identifying neuronal patterns in an image, wherein the second data set equals in at least one of the following parameters with the first data set:

- a dimension;
- a resolution;
- a format.

This facilitates further processing of the second data set, in particular with the same device that was used to obtain the first data set.

A second aspect of this disclosure is related to a device for identifying neuronal patterns in an image, configured to:

- execute a method according to one of the preceding claims; and/or
- interface with a device, in particular an off-premises device, for interacting with a method according to one of the preceding claims.

The device can be a microscope, such as a bright-field microscope, or any other imaging device configured for neuronal patterns. Additionally or alternatively, the device can be a device that performs the method and interacts with a microscope, in particular over a communication network, for obtaining a first data set and/or providing a second data set.

BRIEF DESCRIPTION OF THE FIGURES

Further advantages and features result from the following embodiments, some of which refer to the figures. The figures do not always show the embodiments to scale. The dimensions of the various features may be enlarged or reduced, in particular for clarity of description. For this purpose the figures are at least partially schematized.

In the following description reference is made to the accompanying figures which form part of the disclosure, and which illustrate specific aspects in which the present disclosure can be understood. Identical reference signs refer to identical or at least functionally or structurally similar features.

In general, a disclosure of a described method also applies to a corresponding device (or apparatus) for carrying out the method or a corresponding system comprising one or more devices and vice versa. For example, if a specific method step is described, a corresponding device may include a feature to perform the described method step, even if that feature is not explicitly described or represented in the figure. On the other hand, if, for example, a specific device is described on the basis of functional units, a corresponding method may include one or more steps to perform the described functionality, even if such steps are not explicitly described or represented in the figures. Similarly, a system can be provided with corresponding device features or with features to perform a particular method step. The features of the various exemplary aspects and embodiments described above or below may be combined unless expressly stated otherwise.

DETAILED DESCRIPTION

Figure 1:
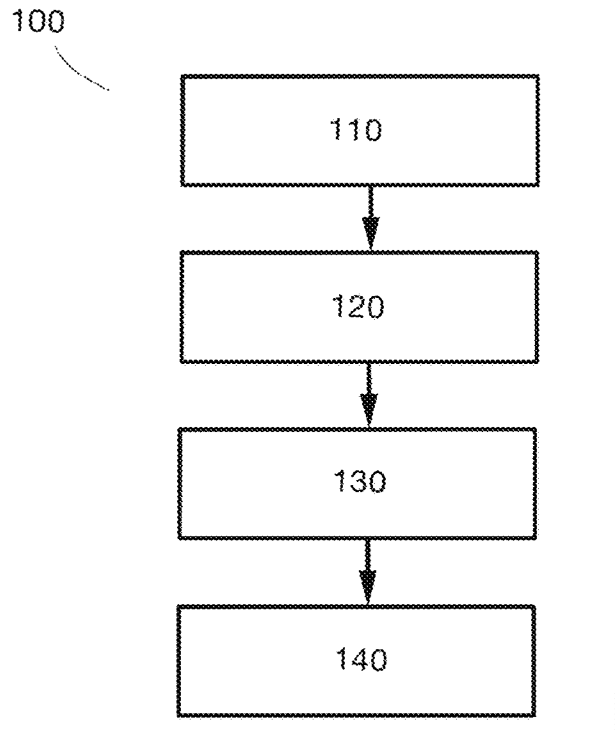
FIG. 1 illustrates a computer-implemented method for identifying neuronal structures according to an embodiment of the disclosure.

FIG. 1 illustrates a computer-implemented method 100 for identifying neuronal structures according to an embodiment of the disclosure. In a first step 110 a first data set with Golgi-stained neuronal structures is obtained. The first data set can be an image captured from a Golgi-stained sample by a microscope.

In a second step 120, based on the first data set, a first auxiliary data set is determined for a first type of neuronal structures. A second auxiliary data set is also determined from the first data set, for a second type of neuronal structure. The first type of neuronal structure can be, e.g., a soma. The second type of neuronal structure can be, e.g., a dendrite. The second type can also comprise a spine. In particular, if dendrites and spines are rather similar in their structure, both neuronal structures can be determined by the same algorithm and then be comprised in the same second auxiliary data set. The method for determining the first and the second auxiliary data sets can be classification methods that are configured, e.g., trained, for the respective neuronal structure, i.e. for somas (first auxiliary data set) and for dendrites/spines (second auxiliary data set).

In a third step 130, the first auxiliary data set is analyzed with a first method to identify information related to a first type of neuronal structure. The first method can be, e.g., Otsu's method that in particular is suitable to detect somata in the auxiliary data set (e.g. a confidence map).

In a fourth step 140, the second auxiliary data set is analyzed with a second method to identify information related to a second type of neuronal structure. The first method can be, e.g., a voxel scooping method that can be suitable to detect dendrites/spines in the auxiliary data set (e.g. a confidence map).

Based on the analyzed results, an image can be generating as a second data set with the identified first and second neuronal structures, i.e. the somata and the dendrites/spines. In other words in a further step, the information generated by the two channels can be integrated for a single result.

Figure 2:
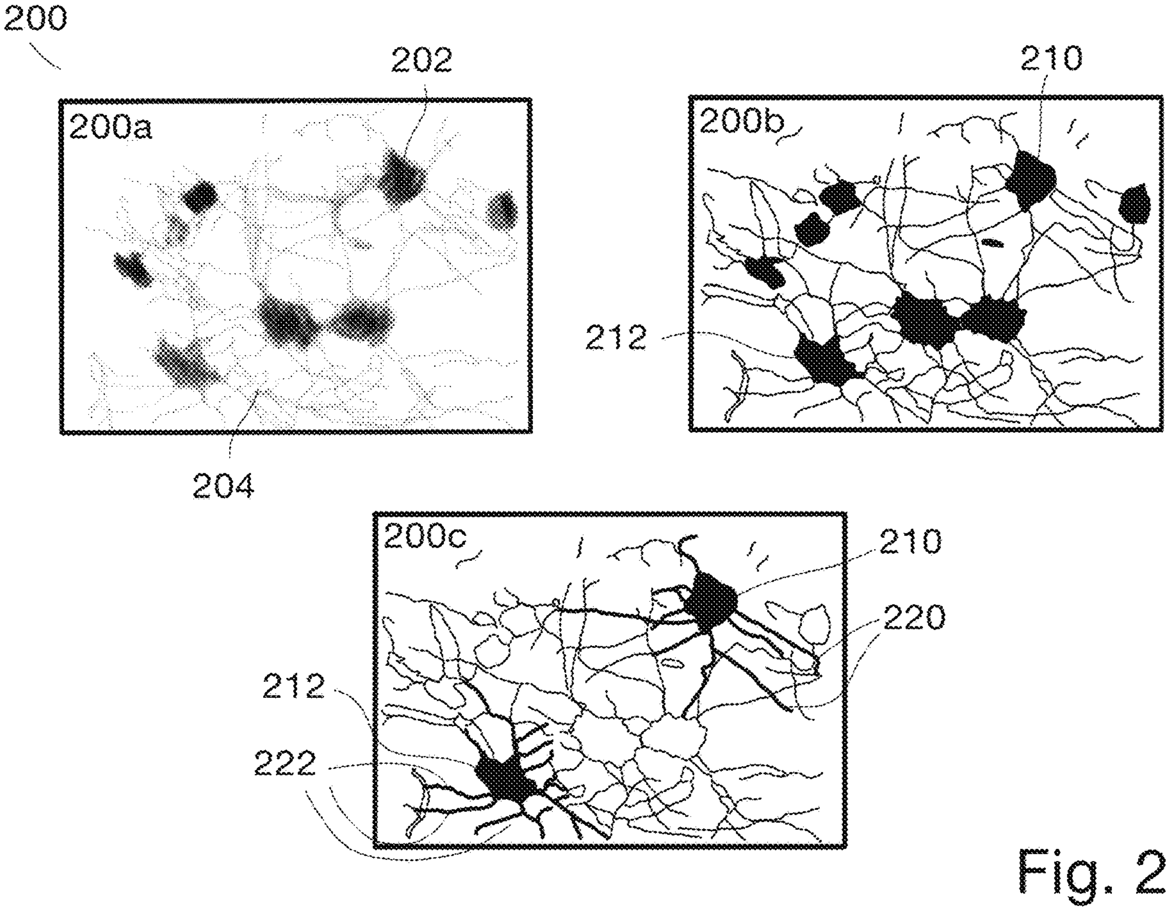
FIG. 2 illustrates a computer-implemented method for identifying neuronal structures according to an embodiment of the disclosure.

FIG. 2 illustrates a computer-implemented method 200 for identifying neuronal structures according to an embodiment of the disclosure. The first image 200*a* shows a first data set of with Golgi-stained neuronal patterns as obtained with a microscope. Neuronal structures such as somata, dendrites, axons, and spines are visible in the image, however they are deteriorated with noise, such as the soma 202 and the dendrite 204. Some structures are shadowed by other structures. Other structures are out of focus. Visual processing must be done to identify neuronal structures and/or complete neurons with more accuracy.

The second image 200*b* shows a partial result of the identification method. The image 200*b* was determined based on an image processing method configured for somata. Thereby, the image 200*a* was processed by a pixel classification method to obtain an auxiliary data set and subsequently a thresholding method, e.g. Otsu's method, was used for separation of somata 210, 212 from the rest of the image.

The third image 200*c* shows a final result of the method. In the image for each identified soma 210, 220, dendrites and spines 220, 222 which belong to the respective soma have been identified. The identification of the dendrites/spines was done with a different data processing algorithm, e.g. a voxel scooping method, than the identification of the somata but based on the same first data set 200*a*. The identification of the dendrites/spines can therefore be performed concurrently or sequentially (i.e. before and after) to the identification of the somata.

Figure 3:
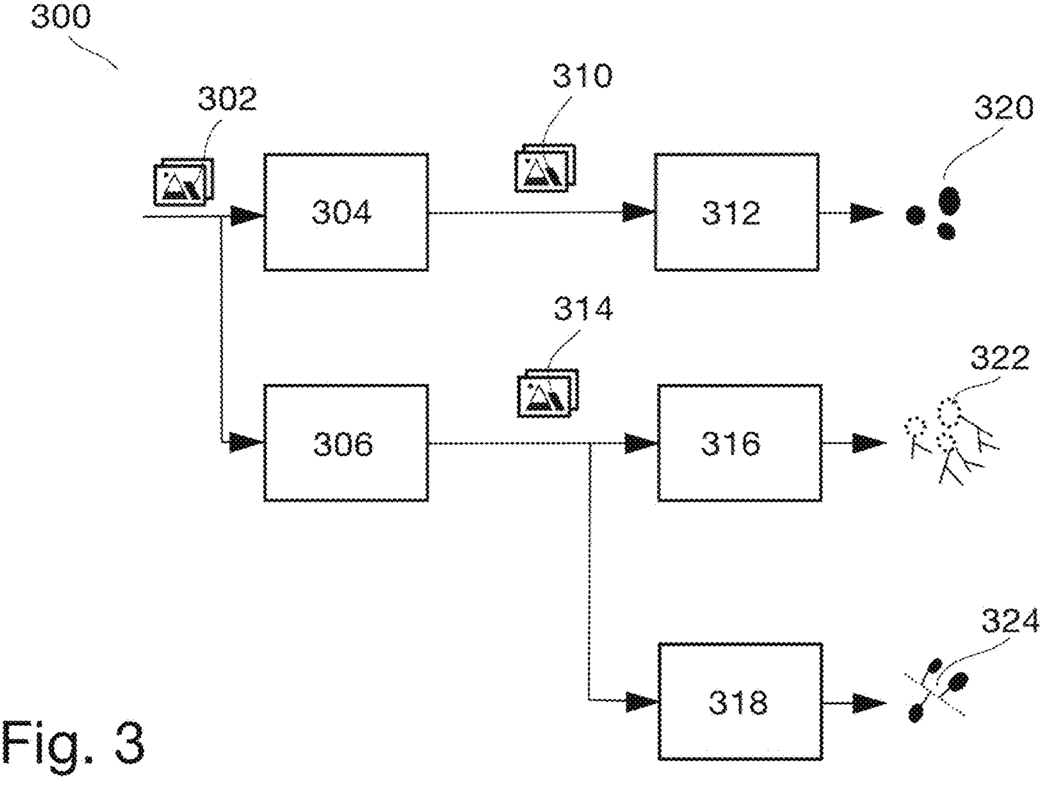
FIG. 3 illustrates a computer-implemented method for identifying neuronal structures according to an embodiment of the disclosure.

FIG. 3 illustrates a computer-implemented method 300 for identifying neuronal structures according to an embodiment of the disclosure. A Golgi-stained image 302 containing one or multiple neurons is the input for the process. Each neuron consists of one soma that connects to one or multiple dendrite trees. Each dendrite tree could contain visible and detectable spines. The overall goal is to detect somas, trace dendrite trees from soma centers, and/or detect spines along each of the dendrite segments.

It can be difficult to directly detect neurons from a Golgi image because neurons are represented as dark voxels in the images as Golgi-stained neurons are imaged using brightfield microscopy using transmitted light. This creates two challenges when segmenting neurons. First, when using brightfield microscopy, the dark stain can create physical shadows resulting in noise in the image. Second, objects that are out of focus display as blurry objects on multiple planes further contributing to the noise level.

To improve the detection accuracy, random-forest-based pixel classification methods can be used to train a pixel classifier by user-teaching and to generate a confidence map with high intensity areas representing the target structures. This can be done for performing a pixel classification for somas 304 and for dendrites and/or spines. The separate pixel classifiers 304, 306 are trained to generate a soma confidence map 310 in which somas are highlighted with high intensity values, and a dendrite/spine confidence map 314 in which dendrite trees and spines are highlighted with high-intensity values.

The soma confidence map 310 can be used for soma detection 312 to generate soma masks 320. The soma detection method 312 can be applying the Otsu threshold to the soma confidence map followed by a few mask refinement steps, such as hole filling and boundary smoothing. Other conventional or deep learning-based object detection methods can also be applied to detect somas from the soma confidence map.

The dendrite/spine confidence map 314 is used for dendrite tracing 316 and/or for spine detection 318. The dendrite tracing 316 can us the voxel scooping method that can start from each soma center. The roots of dendrite trees are first identified on the soma surface. From each root, the voxel scooping method is used to trace outward in small steps following the bright tube-like structure, and traverse through branches until entire dendrite tree 322 is traced. The dendrite diameter is estimated at every small step.

To perform spine detection 318, blob detection can be performed within a certain distance from the dendrite surface defined by the estimated diameter. Valid blobs that can be traced back to the dendrite surface will be detected as spines 324. And those blobs are determined as spine heads with the traces determined as spine necks.

Figure 4:
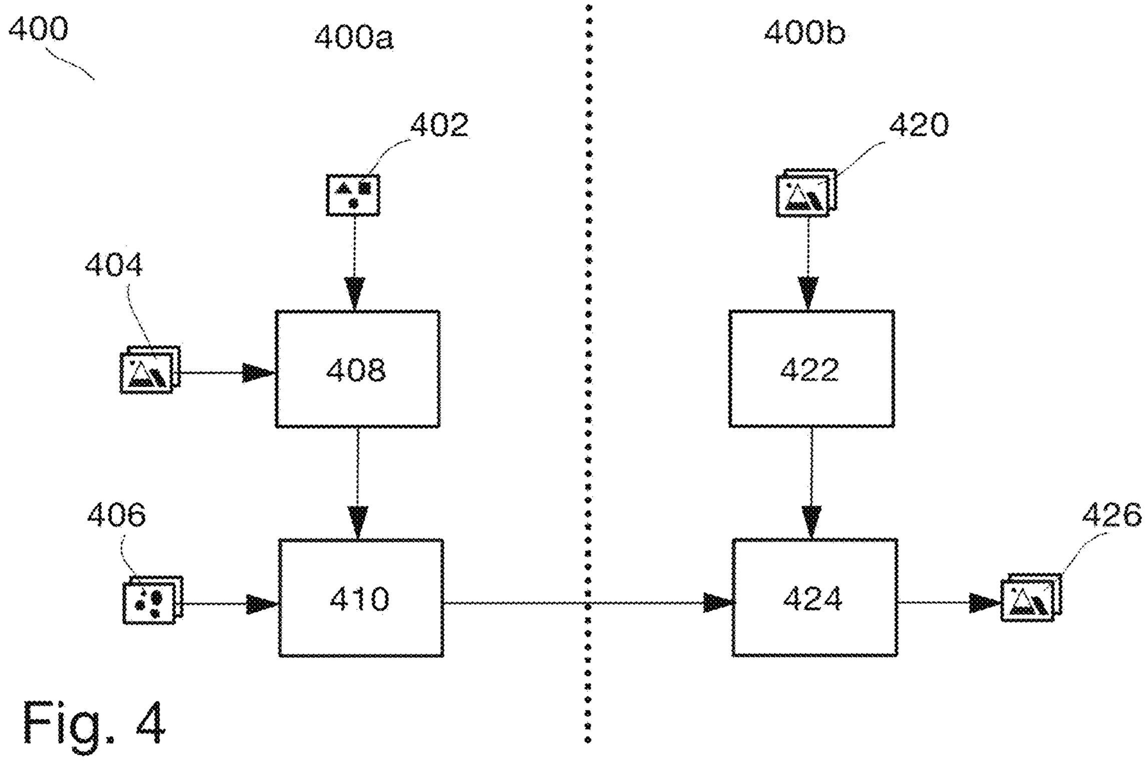
FIG. 4 illustrates a computer-implemented method for identifying neuronal structures according to an embodiment of the disclosure.

FIG. 4 illustrates a computer-implemented method 400 for identifying neuronal structures according to an embodiment of the disclosure. The pixel classifier is a voxel classification algorithm that is based on random-forest classification. It consists of two parts, classifier training and classifier applying. For classifier training 400*a*, one or multiple training images 404 are used as input. In the feature calculation step 408, feature images are computed based on the feature types and kernel sizes parameters 402 set by a user.

Feature types represent image processing filters that can be applied to the input image to generate feature images. Example of feature types are (a) Gaussian blur, (b) maximum, (c) minimum, (d) mean, (e) variance, (f) median, (g) Hessian, (h) difference of Gaussian, (i) Sobel, (j) Laplacian, (k) structure tensor, (I) Gabor, (m) Gabor aggregated, etc. Depending on the size of objects of interest, multiple kernel sizes can be used for all selected filter types.

An example of the feature/filter types selection and kernel sizes selection can be the following combination:

Selected features: (1) Gaussian blur, (2) Hessian, (3) Laplacian Selected kernel sizes: 3, 7, 11

There will be 9 feature images created:

Gaussian blur filter with kernel size 3,
Gaussian blur filter with kernel size 7,
Gaussian blur filter with kernel size 11,
Hessian filter with kernel size 3,
Hessian filter with kernel size 7,
Hessian filter with kernel size 11,
Laplacian filter with kernel size 3,
Laplacian filter with kernel size 7,
Laplacian filter with kernel size 11.

The next step is to train the pixel classifier 410 using the random-forest machine-learning method. The required training data are training samples of individual classes. For pixel classification, every pixel/voxel from the training images could represent a training sample. Sample measurements (pixel/voxel values) are extracted from the feature images at the pixel/voxel location. The ground truth is defined through teach-by-example that the user draws class regions 406 for each of the classes. The ground truth of a sample is set to the class of the region to which the sample belongs. Only pixels/voxels within class regions are used as training samples for the creation of the random forest.

For classifier applying 400*b*, the feature calculation step 422 is performed first, and the same set of feature images are computed for the test images 420. Then the pixel classifier is applied 424 to classify every pixel/voxel of the test images 420 using measurements (pixel/voxel values) from the feature images. The outputs are class confidence maps 426 that represent how likely a pixel/voxel belongs to an individual class.

Figure 5:
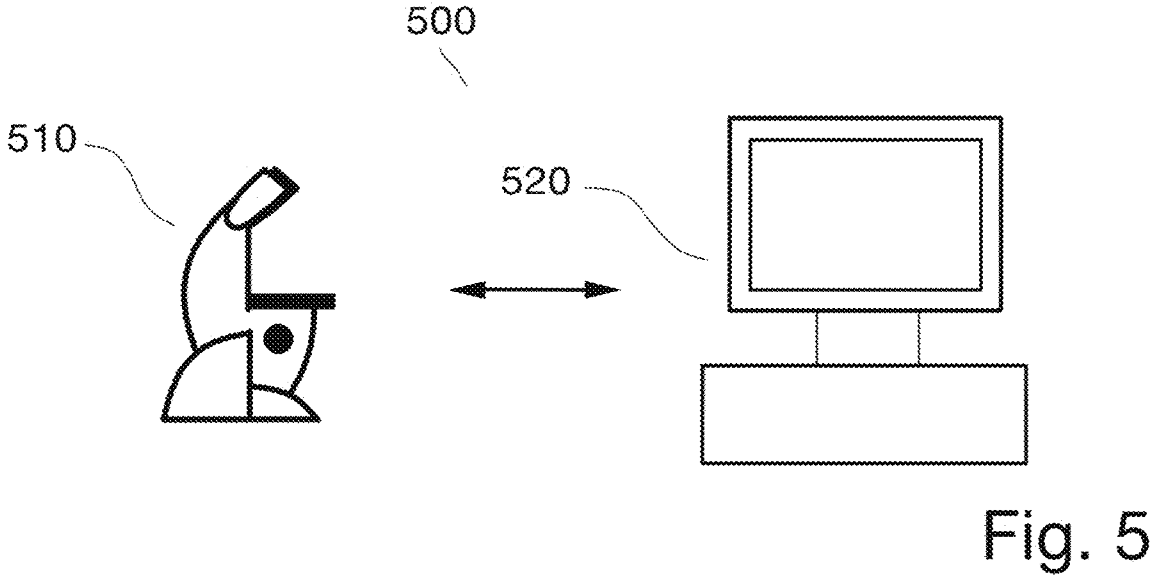
FIG. 5 illustrates a device for identifying neuronal patterns in an image according to an embodiment of the disclosure.

Some embodiments relate to a microscope comprising a system as described in connection with one or more of the FIGS. 1 to 4. Alternatively, a microscope may be part of or connected to a system as described in connection with one or more of the FIGS. 1 to 3. FIG. 5 shows a schematic illustration of a system 500 configured to perform a method described herein. The system 500 comprises a microscope 510 and a computer system 520. The microscope 510 is configured to take images and is connected to the computer system 520. The computer system 520 is configured to execute at least a part of a method described herein. The computer system 520 may be configured to execute a machine learning algorithm. The computer system 520 and microscope 510 may be separate entities but can also be integrated together in one common housing. The computer system 520 may be part of a central processing system of the microscope 510 and/or the computer system 520 may be part of a subcomponent of the microscope 510, such as a sensor, an actor, a camera, or an illumination unit, etc. of the microscope 510.

The computer system 520 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 520 may comprise any circuit or combination of circuits. In one embodiment, the computer system 520 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 520 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 520 may include one or more storage devices, which may include one or more memory elements suitable to the particular application, such as a main memory in the form of random-access memory (RAM), one or more hard drives, and/or one or more drives that handle removable media such as compact disks (CD), flash memory cards, digital video disk (DVD), and the like. The computer system 520 may also include a display device, one or more speakers, and a keyboard and/or controller, which can include a mouse, trackball, touch screen, voice-recognition device, or any other device that permits a system user to input information into and receive information from the computer system 520.

Some or all of the method steps may be executed by (or using) a hardware apparatus, like for example, a processor, a microprocessor, a programmable computer, or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine-readable carrier.

Other embodiments comprise the computer program for performing one of the methods described herein, stored on a machine-readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device, or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied, and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate, or apply the knowledge.

Machine-learning algorithms are usually based on a machine-learning model. In other words, the term "machine-learning algorithm" may denote a set of instructions that may be used to create, train, or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

LIST OF REFERENCE SIGNS

100 flow diagram neuronal structure identification method
110 obtaining Golgi stained image
120 classification for first type neuronal structure
130 analyzing first auxiliary data set
140 analyzing second auxiliary data set
200 method for identifying neuronal structures
200*a* first data set from microscope
200*b* data set with identified somata
200*c* data set with complete identified structures
202 blurred soma
204 blurred dendrite
210 identified soma
212 identified soma
220 identified some with dendrites and spines
222 identified some with dendrites and spines
300 method for identifying neuronal structures
302 Golgi image
304 soma pixel classification
306 pixel classification for dendrites or spines
310 soma confidence map
312 soma detection
314 confidence map for dendrites and spines
316 dendrite tracing 318 spine detection

320 soma masks
322 dendrite tree
324 spines
400 method for identifying neuronal structures
400*a* classifier training
400*b* classifier applying
402 kernel size parameters 404 training images 406 class regions 408 feature calculation
410 pixel classifier
420 test images
422 feature calculation
424 pixel classifier
426 class confidence maps
500 analysis system
510 microscope
520 computer

The invention claimed is:

1. A computer-implemented method for identifying neuronal patterns in an image, the method comprising:
obtaining a first data set with Golgi-stained neuronal structures;
based on the first data set, determining a first auxiliary data set, AR1, based on a first type of neuronal structure and a second auxiliary data set, AR2, based on a second type of neuronal structure;
analyzing ARI with a first method to identify information related to the first type of neuronal structure in ARI;
analyzing AR2 with a second method to identify information related to the second type of neuronal structure in AR2; and
generating a second data set with the identified information related to the first and second type of neuronal structures,
wherein ARI and/or AR2 are generated by a classifying machine learning algorithm.

2. The method according to claim 1,
wherein the first data set comprises a 2D or 3D information of neuronal structures.

3. The method according to claim 1,
wherein at least one AR1 and AR2 comprises one or more confidence maps.

4. The method according to claim 1,
wherein the first type of neuronal structure is a soma.

5. The method according to claim 1,
wherein the second type of neuronal structure is a dendrite.

6. The method according to claim 1,
wherein the machine learning algorithm comprises:
a convolutional neuronal network with a first kernel to generate AR1.

7. The method according to claim 6,
wherein the machine learning algorithm comprises:
a convolutional neuronal network with a second kernel to generate AR2.

8. The method of claim 7, wherein the convolutional neuronal network identifies dendrites to generate AR2.

9. The method of claim 6, wherein the convolutional neuronal network identifies somata to generate AR1.

10. The method according to claim 1,
wherein the machine learning algorithm comprises:
a convolutional neuronal network with a kernel comprising a line feature to generate AR2.

11. The method according to claim 1,
wherein AR1 is analyzed by Otsu's method.

12. The method according to claim 1,
wherein AR2 is analyzed by voxel scooping.

13. The method according to claim 1,
further comprising:
identifying one or more third neuronal structures attached to dendrites.

14. The method of claim 13, wherein the one or more third neuronal structures comprises spine structures.

15. The method according to claim 1,
further comprising:
assigning an identified first neuronal structure to an identified second neuronal structure, and/or to a third neuronal structure.

16. The method according to claim 15, wherein the first neuronal structure comprises a soma, the second neuronal structure comprises a dendrite, and the third neuronal structure comprises a spine.

17. The method according to claim 1,
wherein the second data set equals in at least one of following parameters with the first data set:
a dimension;
a resolution; or
a format.

18. A device for identifying neuronal patterns in an image, the device being configured to execute the method according to claim 1.

19. The method of claim 1, wherein the machine learning algorithm comprises a pixel classifier.

* * * * *